Oct. 7, 1941.  C. E. BETZ  2,258,274
METHOD OF MAGNETIC TESTING
Filed May 22, 1937  3 Sheets-Sheet 1
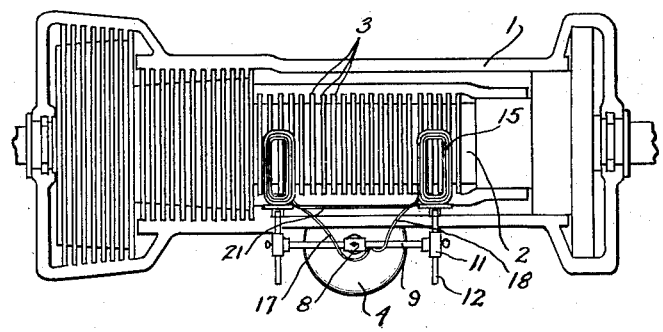
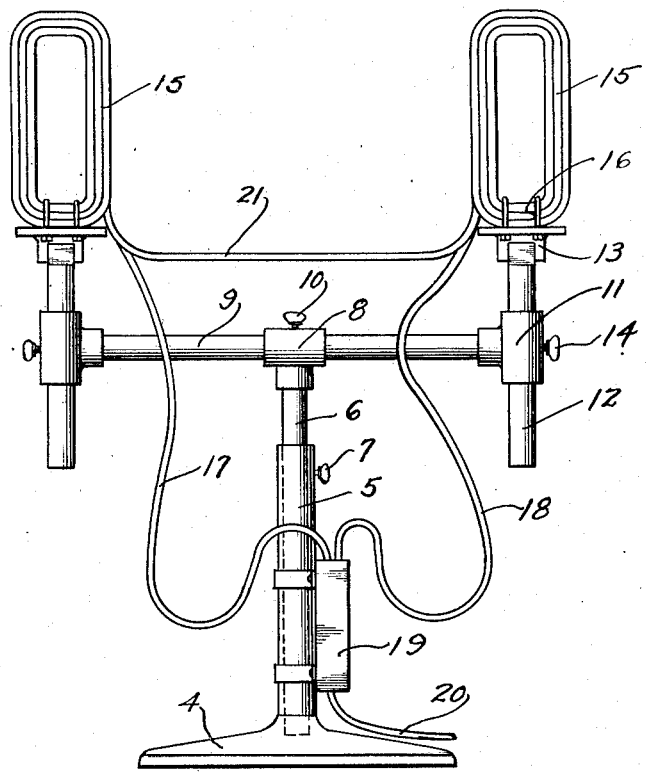
Inventor
CARL E. BETZ.
by Charles H. Neill Attys.

Oct. 7, 1941.  C. E. BETZ  2,258,274

METHOD OF MAGNETIC TESTING

Filed May 22, 1937   3 Sheets-Sheet 2

Inventor
CARL E. BETZ.
by Charles O. Hills Attys.

Oct. 7, 1941.  C. E. BETZ  2,258,274
METHOD OF MAGNETIC TESTING
Filed May 22, 1937  3 Sheets-Sheet 3
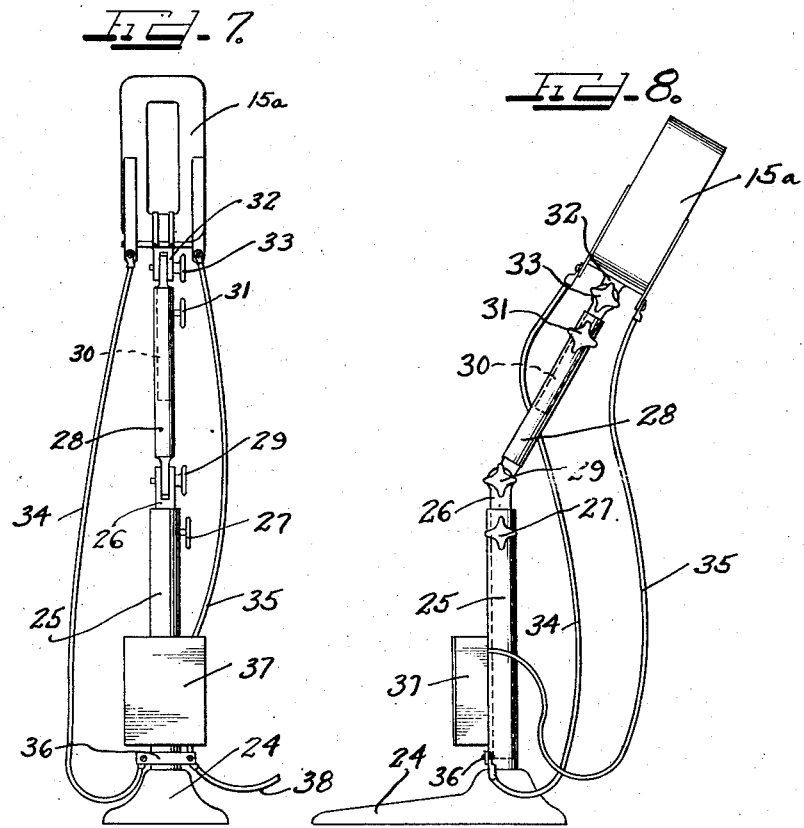
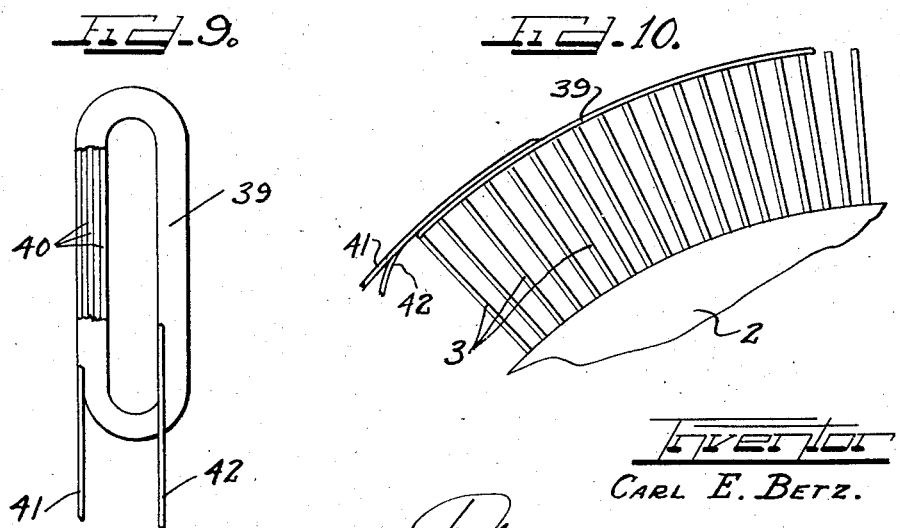
Inventor
CARL E. BETZ.
by Charles H. Mills Attys.

Patented Oct. 7, 1941

2,258,274

UNITED STATES PATENT OFFICE 2,258,274

METHOD OF MAGNETIC TESTING

Carl E. Betz, Park Ridge, Ill., assignor to Magnaflux Corporation, Chicago, Ill., a corporation of Delaware Application May 22, 1937, Serial No. 144,169

1 Claim. (Cl. 175—183)

This invention relates to improvements in a method of magnetic testing, the invention being highly desirable for magnetically inspecting turbine rotors for cracks or other defects in the blades or spindles, although the invention will have other uses and purposes as will be apparent to one skilled in the art.

In the past, in the inspection of turbine blades by the magnetic method, it has been found necessary to wind a number of turns of an electrical conductor around the spindle between rows of blades. With such a method, it was impossible to inspect the blades of a turbine rotor without removing it entirely from the turbine and supporting it on some suitable means permitting rotation of the rotor. The removal of a rotor from a turbine is an exceedingly laborious and expensive task. In addition, this formerly known method provided no way of inspecting the stationary or cylinder blades of the turbine. Furthermore, it was not only cumbersome, but required an objectionable amount of time and expense to wind the conductor around the turbine rotor, usually seven or eight turns on each side of the row of blades to be inspected being necessary, and then shifting the windings to other locations on the spindle as successive rows of blades were inspected.

With the foregoing in mind, it is an important object of the present invention to provide a method of magnetically inspecting turbine blades without removing the turbine rotor from the turbine.

Also an object of this invention is the provision of a method of magnetizing turbine blades, in which the magnetization source is disposed externally of the ends of the blades.

Another feature of the invention resides in the provision of a simple method of magnetically inspecting the stationary or cylinder blades of a turbine.

A further feature of the invention is to provide a method of magnetically inspecting turbine blades, during the practice of which none of the magnetizing apparatus is brought into contact with either the blades or the turbine spindle.

Still a further object of the invention is the provision of a method of magnetically inspecting turbine blades in which a magnetizing source is arranged so that the magnetic flux travels axially of the blades, with the magnetizing source disposed externally of the tips or ends of the blades.

The invention also provides novel apparatus for magnetizing turbine blades so that they are receptive to particles of finely divided paramagnetic material.

It is also a feature of the invention to provide apparatus disposable externally of the ends of turbine blades for magnetizing the same, the apparatus functioning equally as well with a turbine rotor in or out of its housing.

Still another object of the invention is the provision of magnetizing apparatus including a magnetizing source in the form of a coreless coil of electrically conductive material.

A still further feature of the invention is the provision of magnetizing apparatus carrying one or more magnetizing coils in a manner permitting of adjustment in a plurality of directions permitting the selective variance of the height as well as the angular disposition of the magnetizing source.

It is also an important object of the present invention to provide magnetizing means highly desirable for use in connection with turbine rotors and similar apparatus difficult to handle, which means are subject to extremely little wear and consequently are extraordinarily durable.

Still another object of the invention is the provision of a magnetizing coil which may be laid directly upon the outer ends of the turbine blades, and needs no supporting apparatus.

While some of the more salient features, characteristics and advantages of the present invention have been above pointed out, others will become apparent from the following disclosures, taken in conjunction with the accompanying drawings, in which:

Figure 1 is a fragmentary plan view of the cylinder portion of a turbine with the cover removed, illustrating the rotor in proper position in its housing, and showing apparatus embodying principles of the present invention in operative association with the turbine rotor, which rotor is illustrated somewhat diagrammatically;

Figure 2 is a fragmentary elevational view of the aforesaid apparatus alone;

Figure 7 is a front elevational view of a modified form of apparatus embodying principles of the present invention;

Figure 8 is a side elevational view of the apparatus seen in Figure 7;

Figure 9 is a fragmentary plan view, with parts broken away, of a somewhat different form of magnetizing coil embodying principles of the present invention; and Figure 10 is a fragmentary somewhat diagrammatic view illustrating the method used for magnetizing turbine blades, employing the coil shown in Figure 9.

As shown on the drawings:

Figure 3:
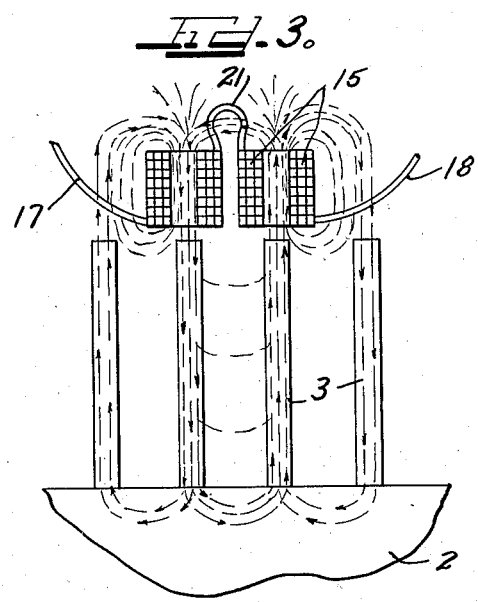
Figure 3 is a fragmentary somewhat diagrammatic view illustrating a method of magnetizing turbine blades embodying principles of the present invention.

The use of the apparatus hereinafter specifically described, and the practice of the method herein set forth, results in the magnetization of a number of turbine blades in each of a plurality of rows of blades, with the magnetic flux passing longitudinally through the blades. After the blades have been sufficiently magnetized, particles of finely divided paramagnetic material are distributed over the blades by any suitable means. Fissures, cracks or other defects in the blades may then be readily detected by a visual examination of the pattern formed by the paramagnetic particles.

After the examination has been completed, the blades may be demagnetized in any desirable or suitable manner. One of the main features of the invention resides in the fact that a turbine rotor may be completely tested by this method without the necessity of removing the rotor from the turbine or, if the rotor is out of the turbine, the test may be made with equal facility.

Before describing the method of performing the test, it may be best to describe an illustrated form of apparatus for magnetizing the rotor.

The illustrated embodiment of the apparatus seen in Figures 1 and 2 is shown associated with a cylinder portion of a turbine including a cylinder housing 1 and a rotor comprising a spindle 2 and a plurality of rows 3 of blades. In Figure 1, the upper portion of the housing is shown removed, but the rotor is in operative position within the turbine, nothing having been disturbed, with the exception of the removal of the housing portion.

With reference more specifically to Figure 2, it will be seen that the magnetizing apparatus includes a standard having a broad base 4, upon which a tubular upright 5 is mounted. A supporting rod 6 is slidable within the tube 5, and the rod may be anchored at any desired height by means of a thumb screw 7. The rod 6 carries a T 8 on the upper end thereof through which a transverse supporting shaft 9 extends, the shaft 9 being rotatable within the T and anchorable in a desired position of adjustment by means of a thumb screw 10 or the equivalent.

At each end thereof, the shaft 9 carries a T 11 in which the shank 12 of a coil support 13 is slidable, the shank being held in a desired position of adjustment relative to the T by a thumb screw 14. A magnetizing coil 15, preferably of generally rectangular outline, is secured to the support 13 at one of the narrow ends of the coil in any suitable manner, such as by the strap 16.

It will be apparent that, with this structure, each of the coils 15 may be adjusted as to height and angular disposition through an extremely wide range. Height may be varied through adjustments of the rod 6; angular disposition, through the shaft 9, and outward extent of the coils from the apparatus, through the respective shank 12. As the apparatus is viewed in Figure 1, the shaft 9 is rotated 90 degrees from the position it occupies in Figure 2, so that the coils 15 are disposed in operative position over the turbine rotor.

It will be noted that each coil 15 is preferably coreless and consists preferably of relatively few turns of a heavy conductor. By way of example and not by way of limitation, a satisfactory coil may consist of twenty-four turns of copper bar approximately one-half inch square, suitably insulated, wound on a form approximately 2 inches by 8 inches, with eight turns to a layer and three layers.

For proper operation, it is not essential that the coil be rectangular in shape, but this shape is preferable so that, when the coil is disposed adjacent the outer end of a plurality of rows of turbine blades, as seen in Figure 1, the long dimension of the coil is of sufficient length to span a plurality of blades in a row.

With reference again to Figure 2, it will be seen that the two coils 15—15 are connected through leads or conductors 17 and 18, one from each coil, to a switch and meter box 19 strapped to the hollow upright 5 in a known manner. Energy is derived from a suitable source through a conducting cable 20. The coils are connected together by a joining conductor 21 in such a manner that when the coils are disposed side by side, as diagrammatically indicated in Figure 3, magnetic flux will rise through the opening in one of the coils and descend through the opening in the other coil.

The coils may be satisfactorily energized by means of an arc-welding generator, not shown in the drawings, using approximately 200 amperes direct current; or they may be energized with an equivalent alternating current from a suitable transformer having a low secondary voltage, although the former method with direct current is the preferred. In addition, it is possible to wind the coils for use on 110-115 direct current or other available current source, but with such construction it is desirable to obtain approximately five thousand ampere turns. Of course, these figures and particulars concerning the coils and their energization are given by way of example and not by way of limitation.

In Figures 3, 4, 5 and 6, I have diagrammatically illustrated the practice of my novel method of inspecting turbine rotor blades as well as stationary or cylinder blades.

With reference to Figure 3, it will be seen that the turbine blades may easily be magnetically inspected while the turbine rotor remains in the turbine, it simply being necessary to produce a magnetic field in such a position and direction in the vicinity of the tips of the blades that the blades constitute a ready or convenient low reluctance path for the magnetic field.

A pair of coils like those above described may be placed relatively closely together so that the openings in the coils overlie adjacent rows of blades. Upon being energized, the magnetic field is established longitudinally through the blades, through the adjacent portion of the spindle, out through the next adjacent rows of blades, completing itself through the area adjacent the coils. The arrangement indicated in this figure permits the inspection simultaneously of four rows of blades, it being understood, as explained above, that the coils include a plurality of blades in each row. After the blades have been so magnetized, particles of finely divided paramagnetic material are sprinkled on the blades, and from the pattern assumed by these particles defects in the blades may readily be located. After the inspection of the blades beneath the coils, the rotor may be revolved sufficiently to bring a plurality of other blades in the same rows beneath the coils, and the process repeated, until all of the blades in the selected four rows have been inspected. The coils are then moved longitudinally along the rotor to the next set of rows of blades to be inspected. Because the coil is open, the blades are visible and the pattern formed by the particles may be noted to determine the effectiveness of the magnetizing force in magnetizing the blades.

It will be noted that there is no necessity of establishing physical contact between any part of the apparatus used and the turbine rotor during the practice of this method, with the single exception, of course, of the application of the paramagnetic material to the blades. It is simply necessary to locate the magnetizing source in proximity to the outer end of the blades under test. It will be noted, therefore, that a turbine rotor may be tested with equal facility whether the rotor is out of the turbine or in operative position in the turbine.

It will also be understood that with the same or a stronger magnetizing source, the blades may be inspected after the current has been turned off, the blades retaining sufficient magnetism to hold the paramagnetic particles in a manner to indicate defects. In addition, it should be noted that with a sufficiently strong current, the magnetizing source may be energized and the turbine spindle given a complete revolution, thereby magnetizing a plurality of rows of blades, which may then be inspected at leisure after the cutting off of the magnetizing source.

With the apparatus shown in Figures 1 and 2, it is not essential to utilize the standards or cross-connections of the apparatus in every instance, it being desirable in some cases to support the coil holding mechanism in suspension above the object to be tested, or to fasten it directly to the turbine body.

Figure 4:
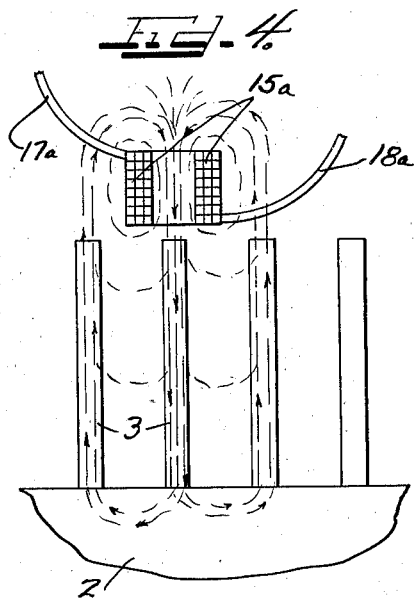
Figure 4 is a fragmentary somewhat diagrammatic view illustrating a slightly different method of magnetizing turbine blades.

In Figure 4, I have illustrated how several rows of turbine blades may be magnetically inspected with the use of a magnetizing source in the nature of only a single coil. The coil 15a corresponds to one of the coils 15 above described, and it is energized through leads 17a and 18a, corresponding to the conductors 17 and 18. The coils 15a is disposed with the center opening over the ends of a plurality of blades in a row as above described in connection with Figure 3. This position of the coil results, upon energization, in magnetic flux traveling downwardly through a row of blades to the spindle, both directions through the adjacent portion of the spindle and upwardly through a row of blades on each side of the first row, the flux path being completed through the air adjacent the coil. This method of inspection may be used very successfully with relatively short turbine blades, while the method described in connection with Figure 3 is preferred for the longer turbine blades, when substantially the same proportion of electrical energy is used in both instances.

Figure 5:
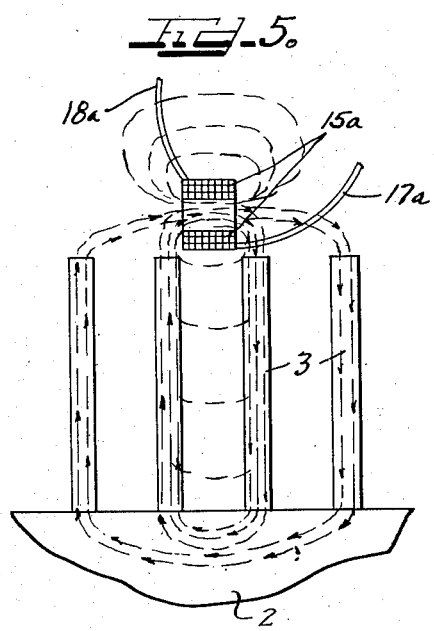
Figure 5 is a fragmentary somewhat diagrammatic view illustrating another embodiment of the method embodying principles of the present invention.

When a single coil is used as a magnetizing source, this coil may also be positioned at an angle of 90 degrees to the showing in Figure 4, as illustrated in Figure 5, so that the magnetic field will be effective over a greater number of rows of blades, this method being highly satisfactory in connection with the testing of short turbine blades. In this instance, as indicated diagrammatically by the arrows, the flux passes downwardly through a pair of adjacent rows of blades, in the same direction through the adjacent part of the spindle 2, and upwardly through another pair of rows of blades, completing the path in the air adjacent the coil.

Figure 6:
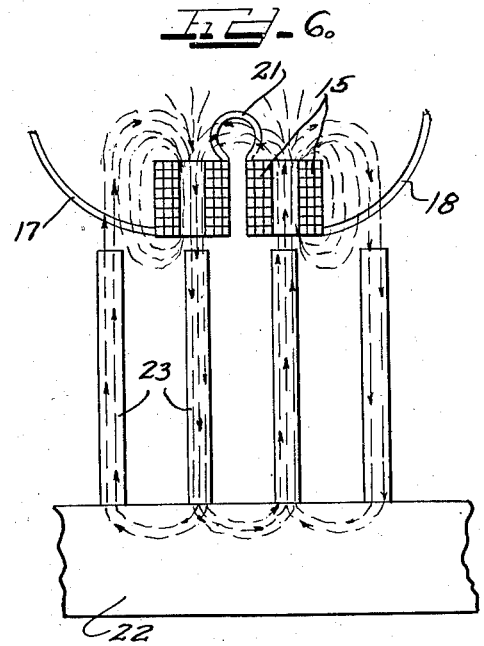
Figure 6 is a fragmentary somewhat diagrammatic view illustrating a method embodying principles of the present invention as used in connection with the magnetization of stationary or cylinder blades of a turbine.

In Figure 6, I have illustrated how the stationary or cylinder blades may be magnetically tested, in this instance using a magnetizing source of the same nature illustrated in Figure 3. The reference numeral 22 indicates a turbine cylinder wall to which various rows 23 of stationary blades are attached. Assuming, for example, that four rows of blades are being tested simultaneously, as illustrated, the magnetic path is downwardly through the first row (at the right of the figure), through the spindle, upwardly through the second row, downwardly through the third row, and upwardly through the fourth row, the various paths being completed through the air adjacent the coils, the two inside rows also completing the paths with each of the outside rows.

It sometimes happens that a lighter and more easily handled form of apparatus from that shown in Figures 1 and 2 is found desirable. Accordingly, in Figures 7 and 8 I have shown another form of apparatus consisting of an adjustable standard construction carrying only a single coil which may readily and easily be located substantially anywhere on the floor or platform in the shop.

This form of apparatus includes a base 24 carrying a hollow upright 25 in which a rod 26 is telescoped, a set screw 27 or the equivalent holding the rod 26 in a desired position of adjustment. The upper end of the rod 26 is bifurcated, and the lower end of a hollow support 28 is pivotally associated with the end of the rod 26, a desired angle of adjustment between these rods being maintained by means of a locking bolt 29 or the equivalent. Another supporting rod 30 is telescopically associated with the hollow support 28, and the degree of adjustment between these two rods may be maintained by means of a set screw 31. A coil support 32 is pivotally associated with the upper end of the supporting rod 30, and the angularity between the coil support and the rod 30 may be selectively varied and maintained in a desirable position of adjustment by a locking bolt 33. A suitable coil 15a, which may be the same as that previously described herein, is held by the coil support 32, and a pair of conductors 34 and 35, respectively, extend to a contact bar 36 and a switch box or the like 37. A suitable conductive medium 38 may be connected to any suitable source of electrical energy.

It will be noted that by a simple and obvious electrical connection, a plurality of coils 15a, each carried by a separate supporting structure, may be connected together and operated from a single switch box 37, the mounting of each coil upon a separate supporting structure giving more flexibility than the apparatus shown in Figures 1 and 2.

In Figure 9, I have illustrated a somewhat different form of magnetizing coil 39 which does not need any supporting structure during its use. This coil is substantially elongated and can, for example, be wound previously or at the job from a number of turns 40 of flexible cable, such as welding cable, which can be taped or otherwise secured to hold its shape but still be flexible enough to be made to conform to the general curvature defined by the tips of the turbine blades. After conforming the coil to this general curvature, it may be either laid or tied in position on the tip ends of the blades. Suitable conductors 41 and 42 may be connected through a switch box or through a suitable source of electrical energy.

In Figure 10, I have illustrated the use of the coil as applied to the aforesaid turbine rotor 2 equipped with rows 3 of blades. The coil is shaped to lay over the outer ends or tips of the blades and, as aforesaid, may be either merely placed in this position or tied in position, as may be deemed most feasible. The magnetization resulting from the coil is the same as that previously described, the magnetic flux running longitudinally of the blades in a row, and quite a number of blades may be simultaneously magnetized. The coil may be easily shifted to cover more blades in the same row. In the event the coil is used upon a rotor of different diameter, the coil will be easily adjusted in shape to fit the contour defined by the tips of the blades. The coil may be equally as well used for magnetizing the blades of a turbine stator.

It should be further noted that with either the coil shown in Figures 9 and 10, or the shorter coils above described, any suitable form of apparatus prepared from the materials usually found in a turbine room may be used, if desired, it not being necessary to have the previously built apparatus of the character shown in Figures 1, 2, 7 and 8 to practice the method of magnetizing embodied in this invention.

It will be further understood that the coil 39 need not of necessity lay over the tips of the blades but may in fact be disposed across the sides of some of the blades in the nature of the chord of a circle, it being only necessary that the blades be subjected to the field of the coil.

From the foregoing, it is apparent that I have provided a novel method for magnetically inspecting devices of the nature of turbine rotors, the method resulting in an easy, simple and inexpensive testing of the turbine blades, without the necessity of removing the rotor from the turbine. The same method may be used with equal facility for the testing of stationary or cylinder blades of a turbine. It is also apparent that I have provided economical, durable and easily manipulated apparatus which may be used for the accomplishment of the method.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

In preparing for inspection purposes by the application of magnetic particles to a group of magnetized turbine blades in adjacently disposed blade rows of a turbine wheel, the method which comprises the steps of placing an elongate air-core coil having spaced apart longitudinally extending sides defining an inspection opening and an elongate air core of unit permeability in position adjacent the tips of the blades of a turbine wheel and extending lengthwise of the blade row so that blades disposed in the path of magnetic flux through the opening and viewable through the opening will have one magnetic polarity and form one leg of a magnetic circuit, and blades disposed adjacent the longitudinally extending coil sides and outwardly of the coil sides will have an opposite polarity and form elements in parallel as the return leg of the magnetic circuit, and energizing said coil to establish a magnetic field embracing the coil and the blades.

CARL E. BETZ.